United States Patent
Thornberg

(10) Patent No.: US 9,004,274 B2
(45) Date of Patent: Apr. 14, 2015

(54) FISHING ROD STORAGE CONTAINER

(71) Applicant: Calvin Thornberg, Forsyth, MT (US)

(72) Inventor: Calvin Thornberg, Forsyth, MT (US)

( * ) Notice: Subject to any disclaimer, the term of this patent is extended or adjusted under 35 U.S.C. 154(b) by 0 days.

(21) Appl. No.: 14/197,473

(22) Filed: Mar. 5, 2014

(65) Prior Publication Data

US 2015/0021871 A1 Jan. 22, 2015

Related U.S. Application Data

(60) Provisional application No. 61/847,856, filed on Jul. 18, 2013.

(51) Int. Cl.
 *A63B 55/04* (2006.01)
 *A01K 97/08* (2006.01)

(52) U.S. Cl.
 CPC ...................... *A01K 97/08* (2013.01)

(58) Field of Classification Search
 CPC ......... A01K 97/06; A01K 97/08; A45C 5/14; A47B 81/005
 USPC ........ 280/37, 47.131, 47.17, 47.26; 211/70.8; 248/65, 67.7, 68.1; 206/373, 503, 216; 220/675, 810, 475, 4.28, 4.26, 23.4
 See application file for complete search history.

(56) References Cited

U.S. PATENT DOCUMENTS

| | | | | |
|---|---|---|---|---|
| 439,562 A * | 10/1890 | Richards | ........................ | 206/317 |
| 1,342,517 A * | 6/1920 | Tyson | ................................ | 211/8 |
| 2,595,230 A * | 5/1952 | Daviau | .............................. | 43/26 |
| 2,726,874 A * | 12/1955 | Sullivan | ........................... | 280/37 |
| 2,781,897 A * | 2/1957 | Dale | ............................... | 206/317 |
| 3,348,329 A * | 10/1967 | Seemann | ........................... | 43/26 |
| 3,399,009 A * | 8/1968 | Slade | ............................. | 312/244 |
| 3,606,372 A * | 9/1971 | Browning | ................... | 280/47.17 |
| 3,802,113 A * | 4/1974 | Gatto, Sr. | .......................... | 43/26 |
| 4,170,801 A * | 10/1979 | Ward | ............................. | 114/343 |
| 4,424,907 A * | 1/1984 | Robb | ........................... | 211/70.8 |
| 4,523,704 A * | 6/1985 | Washington | .................. | 224/328 |
| 4,836,565 A * | 6/1989 | Catalo | ............................. | 280/37 |
| 4,858,366 A | 8/1989 | Rushton | | |
| 4,998,743 A * | 3/1991 | Thielen | ....................... | 280/47.26 |
| 5,168,992 A * | 12/1992 | Bowdy | ....................... | 206/315.6 |
| 5,299,722 A * | 4/1994 | Cheney | .......................... | 224/404 |
| 5,319,874 A * | 6/1994 | Vance | ................................ | 43/26 |
| 5,333,731 A * | 8/1994 | McCuaig | .................... | 206/315.6 |
| 5,582,290 A * | 12/1996 | McCuaig et al. | .......... | 206/315.6 |
| 5,588,542 A * | 12/1996 | Winkler et al. | ............... | 211/70.8 |
| 5,960,950 A * | 10/1999 | Meeker et al. | ........... | 206/315.11 |
| 6,065,595 A * | 5/2000 | Ratcliff | .................... | 206/315.11 |

(Continued)

*Primary Examiner* — Brodie Follman
(74) *Attorney, Agent, or Firm* — Daniel Boudwin; Global Intellectual Property Agency LLC

(57) ABSTRACT

Described is a fishing rod storage container comprising a lid pivotally connected to a container housing by one or more hinges. The container housing comprises a pair of elongated sides and an interior volume adapted to store fishing equipment. The container housing further comprises a plurality of lower half supports extending between the pair of elongated sides that are adapted to support several fishing rods. The lower half supports are elevated above the bottom of the container housing so as to provide clearance for equipment stored on the bottom of the container housing. The lid comprises upper half supports that are positioned so as to align with the lower half supports, such that the lower and upper half supports are complementary halves of a fishing rod support. In this way, a fishing rod can be secured in place between the upper and lower half supports when the container is closed.

11 Claims, 4 Drawing Sheets

(56) References Cited

U.S. PATENT DOCUMENTS

| | | |
|---|---|---|
| 6,119,858 A | 9/2000 | Davidson |
| 6,283,288 B1 * | 9/2001 | Rich .................. 206/315.11 |
| 7,284,763 B1 * | 10/2007 | King .................. 280/47.26 |
| 7,322,149 B1 * | 1/2008 | Quintero .................. 43/26 |
| 2003/0111369 A1 * | 6/2003 | Markowitz, Jr. .......... 206/315.1 |
| 2006/0065560 A1 * | 3/2006 | Dickinson et al. .......... 206/317 |
| 2008/0083680 A1 * | 4/2008 | Silva et al. .................. 211/68 |
| 2012/0255217 A1 * | 10/2012 | O'Dell .................. 43/26 |

* cited by examiner

FISHING ROD STORAGE CONTAINER

CROSS REFERENCE TO RELATED APPLICATION

This application claims the benefit of U.S. Provisional Application No. 61/847,856 filed on Jul. 18, 2013 entitled "Protector." The above identified patent application is herein incorporated by reference in its entirety to provide continuity of disclosure.

BACKGROUND OF THE INVENTION

1. Field of the Invention

The present invention relates to fishing rod storage devices. More specifically, the present invention discloses a container having a lid pivotally connected to a container housing by one or more hinges. The container housing comprises an interior volume adapted to store fishing equipment. The container housing further comprises a plurality of lower half supports on which fishing rods can be placed. The lower half supports are elevated above the bottom of the housing so as to provide clearance for equipment stored on the bottom of the container housing and below the lower half supports. The lid comprises a plurality of upper half supports that align with the lower half supports when the lid is closed, such that the upper and lower half supports are complementary halves of a fishing rod support.

Fishing poles can be difficult to safely store and secure during travel. This is particularly true where a fisherman has multiple fishing rods that need to be transported. If fishing poles are damaged during travel, the fisherman must replace or repair the broken or damaged fishing rods, which can be expensive and inconvenient. Many traditional fishing rod storage containers do not provide separate storage for fishing rods and do not secure the fishing rods within the container. During travel, the equipment in the container and the fishing rods may shift within the container which may result in the rods breaking or otherwise being damaged. Further, once arriving at the destination, fishermen often waste time searching through equipment and may spend considerable time assembling their fishing poles that were fully disassembled for travel. Accordingly, a container that organizes and securely stores fishing rods, while also providing room for additional fishing equipment is desired.

The present invention discloses a fishing rod storage container adapted to securely store fishing rods and other fishing equipment. The container comprises a lid pivotally connected to a container housing by means of one or more hinges. The container housing comprises an interior volume adapted to store fishing equipment. The container housing has a pair of elongated sides and further comprises a plurality of lower half supports extending between the elongated sides. The lower half supports are elevated relative to the bottom of the container housing so as to allow fishing equipment to be stored on the bottom of the container housing and below the lower half supports. The lid of the container includes upper half supports that align with the lower half supports in the container housing, such that when the lid of the container is closed, the lower half supports and the upper half supports are in contact. In this way, a fishing rod positioned on the lower half supports in the container housing can be secured in place between the upper and lower half supports simply by closing the lid of the container.

2. Description of the Prior Art

Devices have been disclosed in the prior art that relate to fishing rod storage cases. These include devices that have been patented and published in patent application publications. These devices generally relate to fishing rod storage cases having a means for securing fishing rods therein. The following is a list of devices deemed most relevant to the present disclosure, which are herein described for the purposes of highlighting and differentiating the unique aspects of the present invention, and further highlighting the drawbacks existing in the prior art.

One such device exemplifying the art is U.S. Pat. No. 4,170,801 to Ward entitled "Fishing Rod and Reel Box" which discloses a fishing rod case that can be mounted within a boat and having a first and second housing section opening towards one another. The housing includes a pair of longitudinal side walls pivotally secured together to allow the case to have an open or closed configuration. Clamp structures are secured to the inner surface of one of the housing sections and are adapted to support a fully assembled rod and reel assembly. Ward does not disclose a fishing rod container that supports fishing rods by means of complementary supports disposed on the container housing and lid of the container that align when the container is closed. Instead, Ward discloses the use of a series of latches to secure fishing rods within a container. Further, Ward does not disclose a fishing rod container having a space for storage of additional equipment.

U.S. Pat. No. 5,319,874 to Vance entitled "Rod and Reel Case" discloses a soft carrying case for fishing poles having a zipper for opening and closing the carrying case. The case comprises straps which are used to hold the fishing poles in place. The straps are permanently secured at one end and are releasably fastened to the case at the other end. Vance does not disclose a case having supports arranged within a container housing and on the lid of the container that align when the lid of the container is closed. Instead, Vance discloses the use of straps to secure fishing rods in the interior of a soft case.

U.S. Pat. No. 6,283,288 to Rich entitled "Fishing Pole and Tackle Case" discloses a fishing pole carrying case comprising a fishing rod container and a separate tackle container. The fishing rod container comprises an interior volume having rod securing means coupled to an interior face of the container. The rod securing means comprise a first and second strap that can be releasably coupled together to secure a fishing rod therebetween. Further, a tackle container is provided, and clasping means are used to secure the tackle container to the fishing rod container. Thus, Rich discloses a fishing rod case having a separated storage area for tackles and other equipment. Additionally, Rich discloses securing means coupled to a face of the container.

U.S. Pat. No. 6,119,858 to Davidson entitled "Carrying Case for Fishing Equipment" discloses a carrying case for fishing rods having multiple compartments for equipment. The case further comprises support surfaces for supporting a portion of the length of a fishing rod. The support surfaces include fasteners which comprise loops and Velcro fasteners. Davidson discloses the use of other fasteners including ties, clips, and snaps. Thus, Davidson discloses a case having separate storage compartments rather than a storage compartment comprising a portion of the case below fishing rod supports. Further, Davidson discloses the use of straps or loops to secure fishing rods in place.

U.S. Pat. No. 4,523,704 to Washington entitled "Car Top Rod and Reel Carrier Apparatus" discloses a container having a top section and a bottom section hingeably connected to one another. The top and bottom sections comprise semi-circular cut outs that align when the container is closed, providing apertures through which fishing rods may extend. Thus, a portion of the fishing rod including the reel is support on the interior of the container, while the remainder of the fishing rod extends outward from the container such that fully assembled fishing rods may be stored. Washington does not disclose a fishing rod container that entirely encloses one or more fishing rods. Further, Washington does not disclose a storage area within the container that provides space for additional equipment.

Finally, U.S. Pat. No. 4,858,366 to Rushton entitled "Fishing Rod Holder and Carrier" discloses a fishing rod carrier comprising a body made of a buoyant material and having a plurality of elongated tubular conduits adapted to hold and store a fully assembled fishing rod. The tubular conduits are arranged in parallel rows within a foam body and are positioned by support frames. Removable protective covers may be disposed at each end of the body of the carrier. Thus, Rushton discloses securing fishing rods in a carrier by placing the rods in tubular members, and does not disclose a carrying case having additional space for storage of other equipment.

These prior art devices have several known drawbacks. Devices are known in the art that disclose fishing rod carriers or containers that secure fishing rods therein by means of straps or belts. Thus, to secure a fishing rod, a user is required to manipulate and tie several straps in order to secure the fishing rod. Similarly, when the user wishes to withdraw a fishing rod from such containers, the user must untie or unfasten the multitude of straps or fasteners. Further, many devices in the prior art do not disclose a fishing rod carrier comprising storage space for other equipment or a fishing net. Thus, a user having fishing rods and other equipment is required to carry the fishing rod case and additional cases adapted to store other equipment. This is inconvenient for the user, and it may be cumbersome for a user to carry multiple containers.

In light of the devices disclosed in the prior art, it is submitted that the present invention substantially diverges in design elements from the prior art and consequently it is clear that there is a need in the art for an improvement to existing fishing rod storage devices. In this regard the instant invention substantially fulfills these needs.

SUMMARY OF THE INVENTION

In view of the foregoing disadvantages inherent in the known types of fishing rod storage cases now present in the prior art, the present invention provides a new fishing rod storage container wherein the same can be utilized for providing convenience for the user when storing fishing rods and other fishing equipment while traveling.

It is therefore an object of the present invention to provide a new and improved fishing rod storage device that has all of the advantages of the prior art and none of the disadvantages.

It is another object of the present invention to provide a fishing rod storage container that is adapted to securely store one or more fishing rods therein.

Another object of the present invention is to provide a fishing rod storage container that is adapted to store fishing rods as well as additional fishing equipment, such as a fishing net.

Yet another object of the present invention is to provide a fishing rod storage container that is able to securely store fishing rods therein that does not require the use of straps, belts, clasps, or other fasteners that require a user to manually secure the fishing rods within the container.

Another object of the present invention is to provide a fishing rod storage container that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
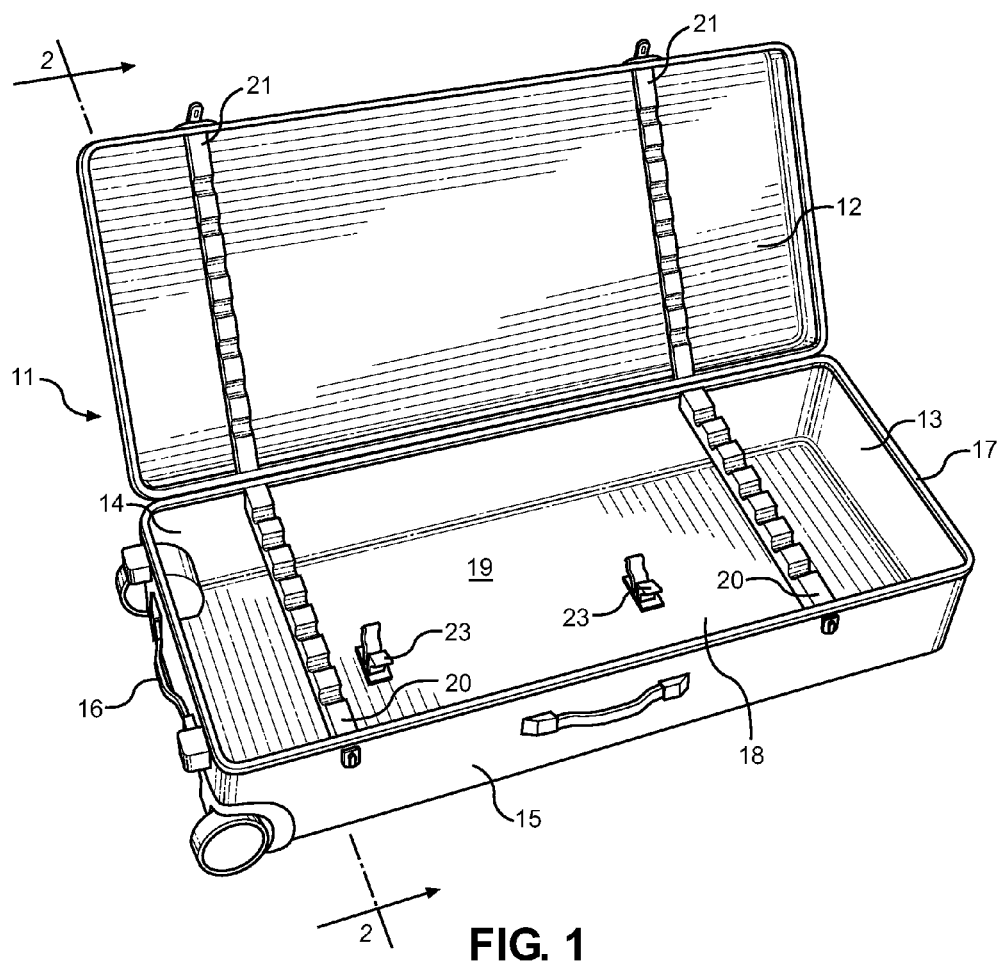
FIG. 1 shows a perspective view of the interior of an embodiment of the fishing rod storage container of the present invention.

Reference is made herein to the attached drawings. Like reference numerals are used throughout the drawings to depict like or similar elements of the fishing rod storage container. For the purposes of presenting a brief and clear description of the present invention, the preferred embodiment will be discussed as used for storing fishing rods and other fishing equipment. The figures are intended for representative purposes only and should not be considered to be limiting in any respect.

Referring now to FIG. 1, there is shown a perspective view of an embodiment of the fishing rod storage container of the present invention in an open configuration. The fishing rod storage container 11 comprises a lid 12 pivotally connected to a container housing 13 such that the container 11 may be arranged in an open or closed configuration. The lid 12 may be connected to the container housing 13 by means of one or more hinges. The embodiment shown has a lid 12 attached to the container housing 13 on the first elongated side 14 of the container housing 13, however, other embodiments of the present invention may include the lid in pivotal connection with other sides or ends of the container housing.

The container housing 13 comprises a first elongated side 14 opposite a second elongated side 15, a first end 16 opposite a second end 17, and a bottom 18, defining an interior volume 19. In the embodiment shown, the container housing 13 has a substantially rectangular shape. The container housing 13 further has an open upper end providing access to the interior volume 19. The interior volume 19 is adapted to store a variety of fishing equipment therein. In some embodiments of the present invention, one or more clasps 23 are attached to the bottom 18 of the container housing 13 that are adapted to secure an elongated member of equipment, such as the handle of a fishing net.

The fishing rod storage container 11 further comprises one or more lower half supports 20 arranged therein. The lower half supports 20 extend between a first side 14 and a second side 15 of the housing 13. The lower half supports 20 are elevated above the bottom 18 of the container housing 13 so as to provide clearance for equipment stored on the bottom 18 of the container housing 13, and below the lower half supports 20. Thus, the lower half supports 20 are arranged on an upper portion of the container housing 13, and in some embodiments of the present invention the supports are arranged on an uppermost portion of the housing 13. Accordingly, the bottom 18 of the container housing 13 is reserved for storage of additional fishing equipment. One or more partially disassembled fishing rods may be placed transversely on the lower half supports 20 and can be enclosed within the container 11. The lid 12 of the container comprises upper half supports 21 that align with the lower half supports 20 in the container housing 13. When the container is in a closed configuration, the lower half supports 20 in the container housing 13 contact the upper half supports 21 on the lid 12, such that the upper and lower half supports comprise complementary halves of a fishing rod support. In this way, fishing rods can be secured in place between the lower half supports 20 and the upper half supports 21 when the container 11 is in a closed configuration.

Figure 2:
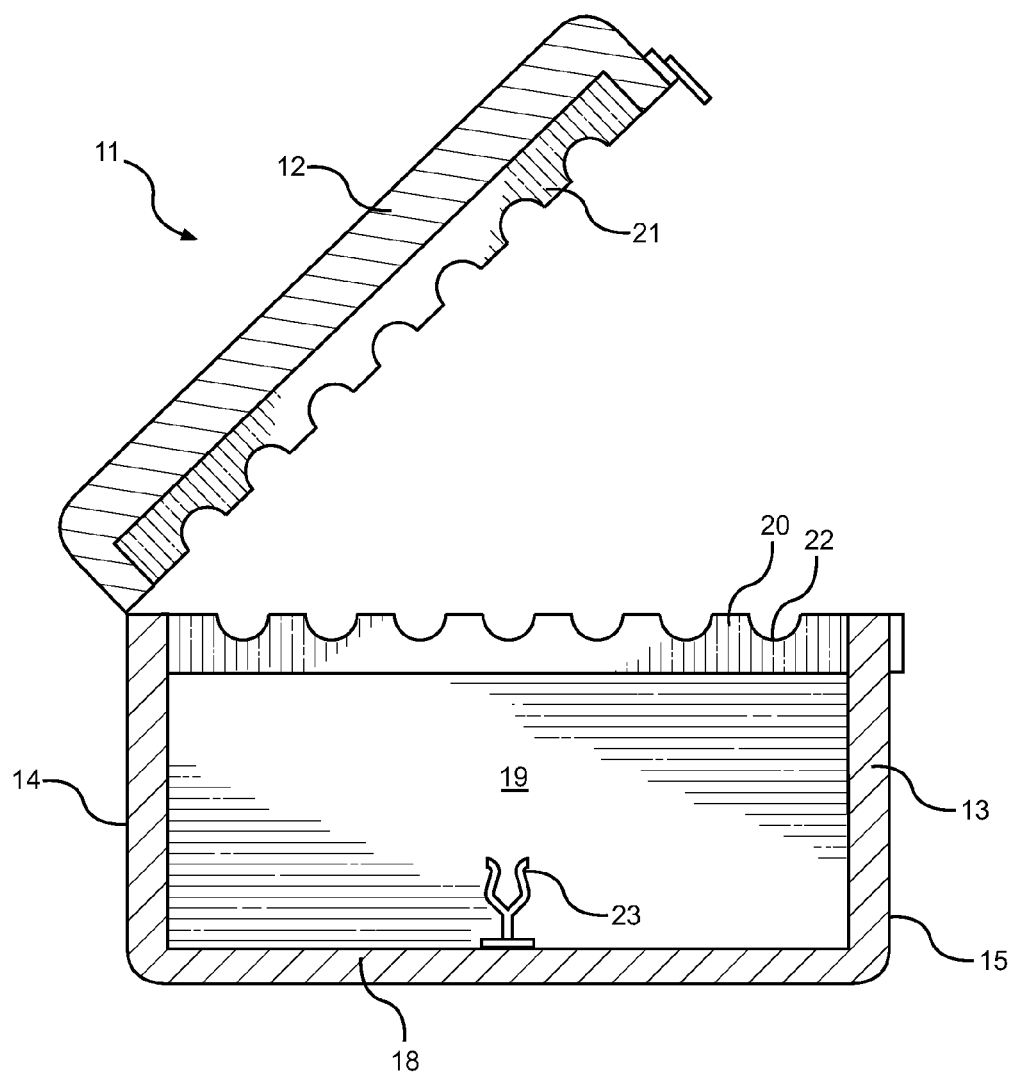
FIG. 2 shows a cross-sectional view of an embodiment of the fishing rod storage container of the present invention.

Referring now to FIG. 2, there is shown a cross-sectional view of an embodiment of the fishing rod storage container of the present invention. The fishing rod storage container 11 comprises one or more lower half supports 20 that extend between the first elongated side 14 of the container housing and the second elongated side 15 of said container housing. The lower half supports 20 are elevated above the bottom 18 of the container housing 13 and are positioned so as to provide clearance for equipment stored on the bottom 18 of the container housing 13, below the lower half supports 20. To facilitate the storage of additional equipment in the interior volume 19 of the container housing 13 below the lower half supports 20, one or more clasps 23 are positioned on the bottom 18 of the container housing 13 and are adapted to secure an elongated member of a piece of fishing equipment.

The lid 12 comprises one or more upper half supports 21 that are positioned so as to align with the lower half supports 20 in the container housing 13. In some embodiments of the present invention, the lower half and upper half supports 20,21 on the container housing 13 and on the lid 12 may further comprise grooves 22 adapted to receive a portion of a fishing rod therein. The lower half supports 20 comprise grooves 22 on an upper surface thereof, whereas the upper half supports 21 comprise grooves 22 on a lower surface thereof. In this way, when the container is closed, the grooves 22 on the lower half supports 20 and on the upper half supports 21 align so as to define apertures in which fishing rods may be positioned.

Figure 3:
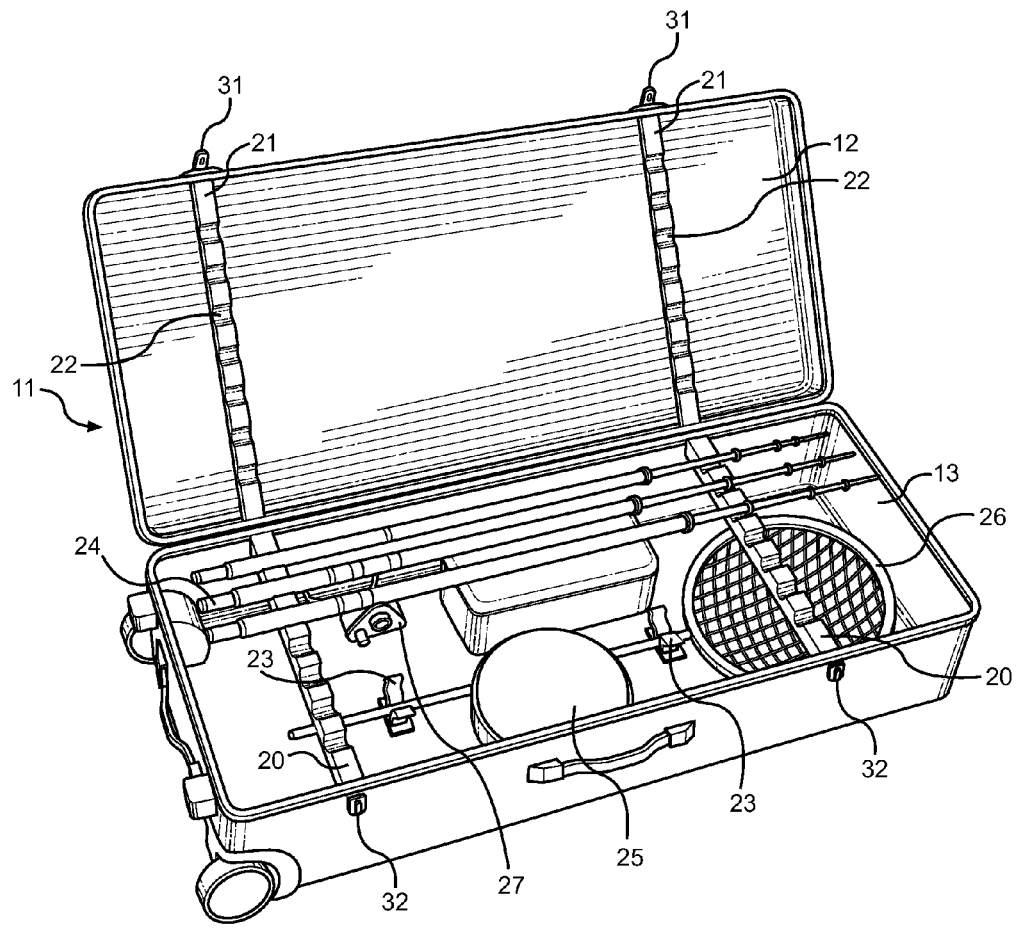
FIG. 3 shows a perspective view of the interior of an embodiment of the fishing rod storage container of the present invention filled with fishing rods and other equipment.

Referring now to FIG. 3, there is shown a perspective view of an embodiment of the fishing rod storage container of the present invention filled with fishing rods and other equipment. Fishing rods 24 may be placed on the lower half supports 20 in the container housing 13 in a transverse orientation, wherein the fishing rods are substantially parallel to the elongated sides of the container. In this way, several fishing rods may be placed on the lower half supports 20 and fully enclosed within the container 11. The lower half supports 20 are separated from one another so as to provide sufficient space for the reels 27 of the fishing rods 24. Further, additional fishing equipment 25 can be stored on the bottom of the housing 13 in the area below the lower half supports 20. A fishing net 26 or any other elongated member of equipment may be stored in the area below the lower half supports 20 and can be secured by one or more clasps 23 attached to the bottom of the container.

The lower half supports 20 are composed of flexible material such as foam so that the lower half supports can conform to the shape of the fishing rods and provide cushioning for the fishing rods. In some embodiments of the invention, the lower half and upper half supports 20,21 comprise a plurality of grooves 22 in which fishing rods may be secured. The grooves 22 help to secure the fishing rods in a particular position within the container 11 and help to organize multiple fishing rods along the lower half supports 20.

Figure 4:
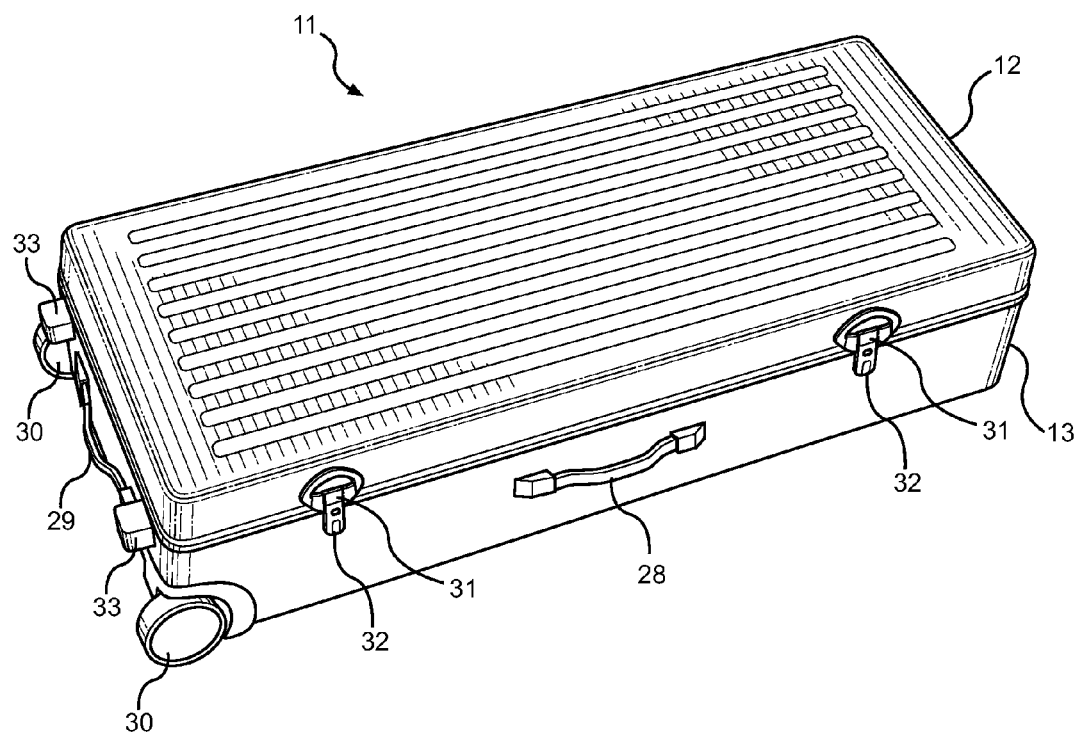
FIG. 4 shows a perspective view of the fishing rod storage container of the present invention in a closed configuration.

Referring now to FIG. 4, there is shown a perspective view of the fishing rod storage container of the present invention in a closed configuration. The container 11 can be secured in a closed configuration by means of one or more latches 31. The latches 31 are disposed on the lid 12 of the container 11 on the second elongated side of the container, opposite the hinge, and are adapted to engage with and releasably secure to pins 32 disposed on the container housing 13. By engaging the latches 31 with the pins 32, the container 11 can be maintained in a closed configuration throughout travel, despite any jostling of the storage container.

The fishing rod storage container may comprise a pair of wheels 30 positioned on the first end of the container housing that allow a user to roll rather than carry the storage container. A handle is disposed on the second end of the container housing, opposite the wheels, to allow a user to pull the storage container similarly to the way in which a user may travel with a suitcase. In some embodiments of the invention, the handle at the second end of the container housing is retractable and allows a user to selectively elongate the handle for ease of travelling. Additionally, a handle 28 may be disposed on the first or second elongated side of the container, or a handle 29 may be positioned on the first or second end of the container. Thus, the storage container provides a user with a variety of options for how to carry the container. While the storage container can be rested such that the bottom of the container housing is on a flat surface, the container is also adapted to stand in an upright position. The container comprises two or more feet 33 adapted to achieve this purpose.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod storage container, comprising:
    a container housing and a lid, wherein said container housing comprises a first elongated side, a second elongated side, a first end, a second end, and a bottom defining an interior volume;
    wherein said lid is pivotally connected to said container housing by means of one or more hinges such that said lid can be arranged in an open or closed configuration;
    wherein said container housing comprises one or more lower half supports extending between said first elongated side and said second elongated side;

wherein said one or more lower half supports are elevated above said bottom of said container housing, thereby providing clearance for equipment adapted to be stored on said bottom of said container housing and below said one or more lower half supports;

wherein said lid comprises one or more upper half supports that align with and contact said one or more lower half supports in said container housing when said lid is in a closed configuration;

each upper half support and lower half support comprising complementary halves of a fishing rod support that is adapted to support one or more fishing rods securely there between and in an elevated position within said container housing when said lid is in a closed configuration;

said one or more lower half supports on said container housing comprise a plurality of grooves adapted to receive a portion of a fishing rod, said lower half supports are suspended above said bottom of said container housing; and wherein said one or more upper half supports on said lid comprise a plurality of grooves that align with said plurality of grooves on said one or more lower half supports when said lid is in a closed configuration.

2. The fishing rod storage container of claim 1, further comprising:
  a plurality of wheels disposed on said first end of said container housing;
  a handle disposed on said second end of said container housing.

3. The fishing rod storage container of claim 1, further comprising a handle attached to said container housing.

4. The fishing rod storage container of claim 1, wherein said container housing is substantially rectangular.

5. The fishing rod storage container of claim 1, wherein said container comprises a plurality of feet disposed on a first end of said container housing that are adapted to allow said container to stand in an upright position.

6. The fishing rod storage container of claim 1, wherein said one or more lower half supports on said container housing, and said one or more upper half supports on said lid are composed of a flexible material.

7. The fishing rod storage container of claim 1, wherein said container comprises one or more latches adapted to secure said lid to said container housing when said lid is in a closed configuration.

8. The fishing rod storage container of claim 1, wherein
  said container comprises one or more pins disposed on said container housing;
  wherein said lid comprises one or more latches; and
  wherein said pins and said latches are adapted to engage so as to releasably secure said container in a closed configuration.

9. The fishing rod storage container of claim 1, wherein said bottom of said container housing comprises one or more clasps adapted to secure elongated members of equipment therein.

10. The fishing rod storage container of claim 1, wherein said lower half supports are elevated relative to said bottom of the container housing to allow fishing equipment to be stored in said bottom of the container housing and below said lower half supports.

11. The fishing rod storage container of claim 10, wherein said bottom of the container housing is visible below said lower half supports.

* * * * *